United States Patent
Qiu et al.

(10) Patent No.: US 7,652,716 B2
(45) Date of Patent: Jan. 26, 2010

(54) COMPUTER-CONTROLLED LIGHTING FOR VIDEO COMMUNICATION

(75) Inventors: Jingyu Qiu, Issaquah, WA (US); Regis J. Crinon, Camas, WA (US); Warren V. Barkley, Mill Creek, WA (US)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 11/756,585

(22) Filed: May 31, 2007

(65) Prior Publication Data

US 2008/0297611 A1 Dec. 4, 2008

(51) Int. Cl.
*H04N 5/222* (2006.01)
*H04N 7/14* (2006.01)

(52) U.S. Cl. .................... 348/370; 348/14.01

(58) Field of Classification Search ............ 348/370, 348/371, 14.01, 14.07, 14.08, 14.1, 14.12
See application file for complete search history.

(56) References Cited

U.S. PATENT DOCUMENTS

| | | | |
|---|---|---|---|
| 3,691,302 A | 9/1972 | Gaebele et al. | |
| 4,514,727 A | 4/1985 | Van Antwerp | |
| 4,641,349 A * | 2/1987 | Flom et al. | 382/117 |
| 4,866,526 A | 9/1989 | Ams et al. | |
| 4,928,172 A | 5/1990 | Uehara et al. | |
| 5,131,381 A | 7/1992 | Ams et al. | |
| 5,327,228 A * | 7/1994 | Satyanarayana et al. | 348/647 |
| 5,742,340 A | 4/1998 | Alves | |
| 6,201,880 B1 | 3/2001 | Elbaum et al. | |
| 6,980,697 B1 | 12/2005 | Basso et al. | |
| 7,559,892 B2 * | 7/2009 | Adler et al. | 348/69 |
| 7,589,783 B2 * | 9/2009 | Simpkins et al. | 348/370 |
| 2003/0120447 A1 * | 6/2003 | Dzioba | 702/85 |
| 2004/0037468 A1 * | 2/2004 | Morishima et al. | 382/218 |
| 2005/0253923 A1 * | 11/2005 | Komori et al. | 348/14.01 |
| 2006/0119701 A1 | 6/2006 | King | |
| 2006/0126894 A1 * | 6/2006 | Mori | 348/14.01 |
| 2006/0133663 A1 * | 6/2006 | Delaney | 382/152 |
| 2006/0262333 A1 | 11/2006 | Jenkins | |
| 2007/0081094 A1 | 4/2007 | Ciudad et al. | |
| 2007/0139515 A1 * | 6/2007 | Du Breuil | 348/14.01 |
| 2007/0146539 A1 * | 6/2007 | Kawahara et al. | 348/370 |
| 2009/0008530 A1 * | 1/2009 | Wernersson | 257/88 |

FOREIGN PATENT DOCUMENTS

JP 2003015211 A * 1/2003

OTHER PUBLICATIONS

Lee, et al., "An Advanced Video Camera System with Robust AF, AE, and AWB Control," Dated Aug. 2001, pp. 1-6.
Stauder, J., "Augmented Reality with Automatic Illumination Control Incorporating Ellipsoidal Models," Dated Jun. 2, 1999 pp. 100-107.

* cited by examiner

*Primary Examiner*—Jason Whipkey

(57) ABSTRACT

A video communication system may include a computer program that implements a feedback control process for automatically controlling a light. The feedback control process may include receiving an image from a video camera and determining an initial difference between the received image and a stored image. For example, the feedback control process may determine, on a pixel-by-pixel basis, whether the color and intensity of a facial region in the captured image is sufficiently close to the color and intensity of a facial region in the stored image. If the difference between the captured image and the stored image exceeds a threshold, the feedback control process includes transmitting an optimization instruction to the light. This optimization instruction, when performed by the light, decreases the difference between the received image and the stored image.

17 Claims, 4 Drawing Sheets

COMPUTER-CONTROLLED LIGHTING FOR VIDEO COMMUNICATION

BACKGROUND

Lighting is one factor that affects video quality. If lighting is not right, video quality suffers. Professional video organizations, such as television and film studios, may employ extensive expertise and equipment to ensure appropriate lighting.

The expertise and equipment available to professional video organizations may not be available to many users, such as users of a desktop video communication system. Accordingly, lighting is often not right for desktop video communication. A variety of problems may lead to poor lighting, including insufficient light on a user's face, background lighting that is too bright, and other problems. These problems may cause the face to appear dark on the one hand or washed-out on the other, making the image less appealing and possibly unrecognizable.

Although software and hardware solutions may be used to reduce the impact of poor lighting, it may be more desirable to provide suitable lighting prior to capturing an image than to correct the image after it has been captured with poor lighting. If the lighting becomes sufficiently poor, attempts to correct for poor lighting after the image has been captured may not be feasible.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A video communication system may include a computer program that implements a feedback control process for automatically controlling a light. The feedback control process may include receiving an image from a video camera and determining an initial difference between the received image and a stored image. For example, the feedback control process may determine, on a pixel-by-pixel basis, whether the color and intensity of a facial region in the captured image is sufficiently close to the color and intensity of a facial region in the stored image. If the difference between the captured image and the stored image exceeds a threshold, the feedback control process includes transmitting an optimization instruction to the light. This optimization instruction, when performed by the light, decreases the difference between the received image and the stored image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer system, the system described is provided as an example and not a limitation. As those skilled in the art will appreciate, the present examples are suitable for application in a variety of different types of communication systems.

Figure 1A:
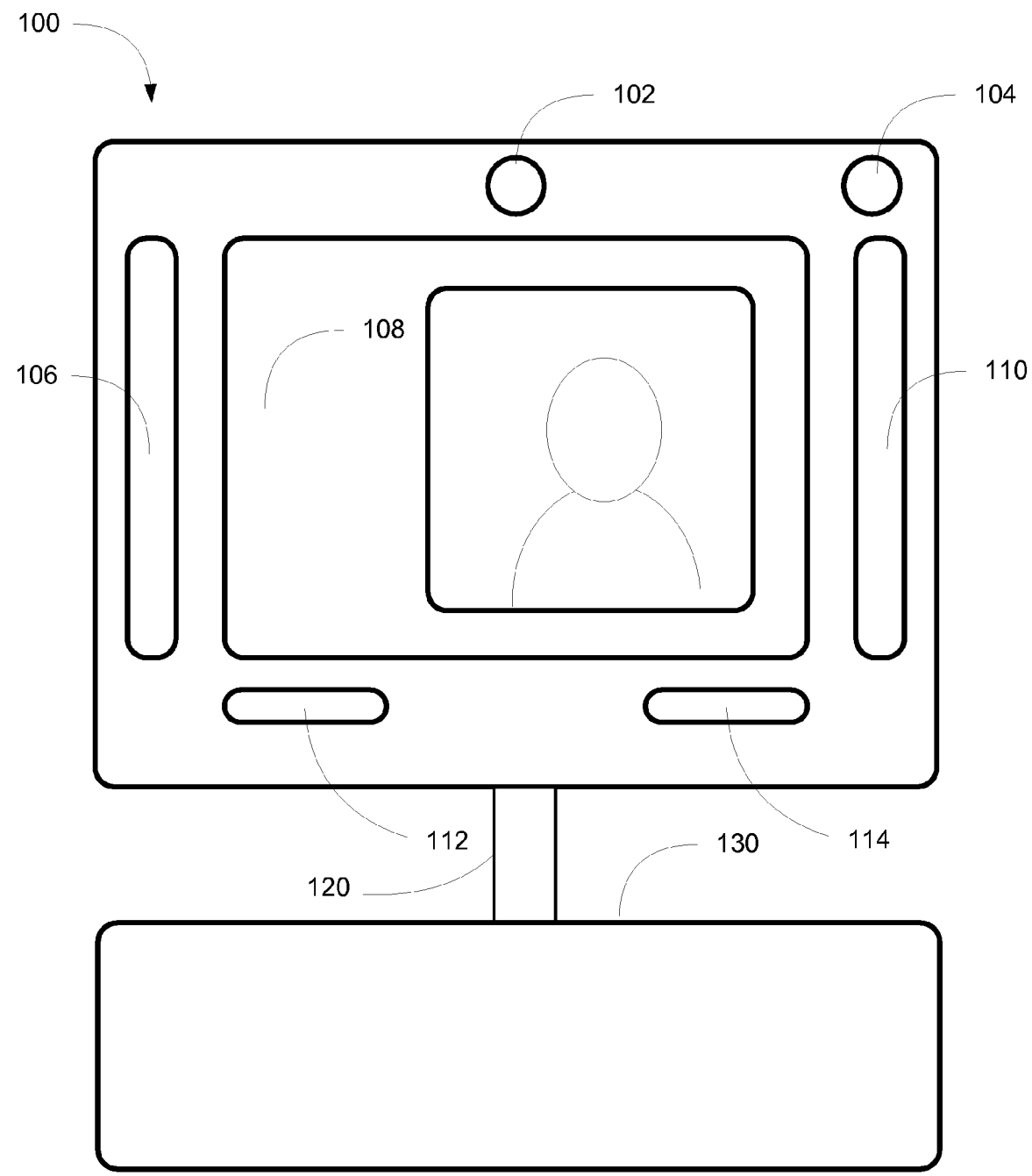
FIG. 1A is an illustration of a video communication system in an exemplary implementation having lights integrated into a display unit.

FIG. 1A is an illustration of a video communication system in an exemplary implementation having lights integrated into the display unit 100. The display unit 100 may be a computer monitor, a laptop display, a television, or other device. The display unit 100 includes two integrated lights 106 and 110. Although two lights are shown having a vertical orientation, other number and/or orientations may be used including horizontal lights, a combination of horizontal and vertical lights, a ring of lights around display area 108, and/or a single light. Also, any vertical or horizontal opening may be a continuous slit or a series of holes and the size of the opening may be adjustable. Similarly, although the lights are depicted as slender lights (e.g., long and narrow), other embodiments may include a line or series of smaller lights, and these lights may be positioned as described above. Providing a number of smaller lights may provide greater control for the feedback process, as individual lights may be controlled separately.

The display unit 100 also includes a display area 108. The display area 108 is the portion of the display unit 100 that displays images in accordance with instructions from the CPU as described in greater detail with respect to FIG. 2. In one embodiment, the display area 108 includes one or more display frames having one or more images relating to a video conferencing application. For example, the display area may include any combination of an image of a first user captured by camera 102, a second user captured by a remote camera (not shown) who is talking to the first user, a combination the first and second user, information about a video conference between the first and second user, and/or other information.

The display unit 100 may have additional integrated devices, including any combination of a camera 102, microphone 104, and one or more speakers 112 and 114. Although these additional devices are shown as integrated, an alternative embodiment may have some or all of these devices as stand-alone devices that are coupled with the display device and/or console 130. For example, the video communication system may include external speakers, an external camera, and/or an external microphone connected by USB, mini-jack, etc., instead of or in addition to the devices depicted in FIG. 1A.

The console 130 or system unit, which houses the central processing unit or CPU (shown in FIG. 3), may be a tower, a laptop base, or other computing or terminal device. The console 130 may be coupled to the display unit 100 by connector 120. Connector 120 may provide structural support for the display unit 100, or structural support may be provided by other means (e.g., a display stand) or may not be required (e.g., if the display device is a television). Although console 130 is depicted as a device physically separated from display unit 100, the display unit 100 may be integrated with the console 130 (e.g., a personal digital assistant, a smart phone, a tablet personal computer, a video camera, etc.).

Although integrated lights 106 and 110 have been described as dedicated lights, they may also be lights having multiple purposes. For example, integrated lights 106 and 110 may be created by partially or fully exposing a liquid crystal display (LCD) fluorescent light (e.g., the tube that provides light to an LCD screen). Because the intensity of the LCD fluorescent light may be fixed for a given video session (e.g., to provide light to the display), integrated lights 106 and 110 that are LCD lights may be used in combination with an auxiliary light 116 described below with respect to FIG. 1B. In an alternative embodiment, the display area 108 may be used as a supplemental light source (e.g., its color and brightness may be adjusted to provide suitable lighting for the video session). However, due to strain that looking directly into a bright light may have on a user's eyes, it may be appropriate to use this technique for short durations, to brighten only an outer section of the display area 108, or otherwise take steps to minimize the strain on the user's eyes.

Figure 1B:
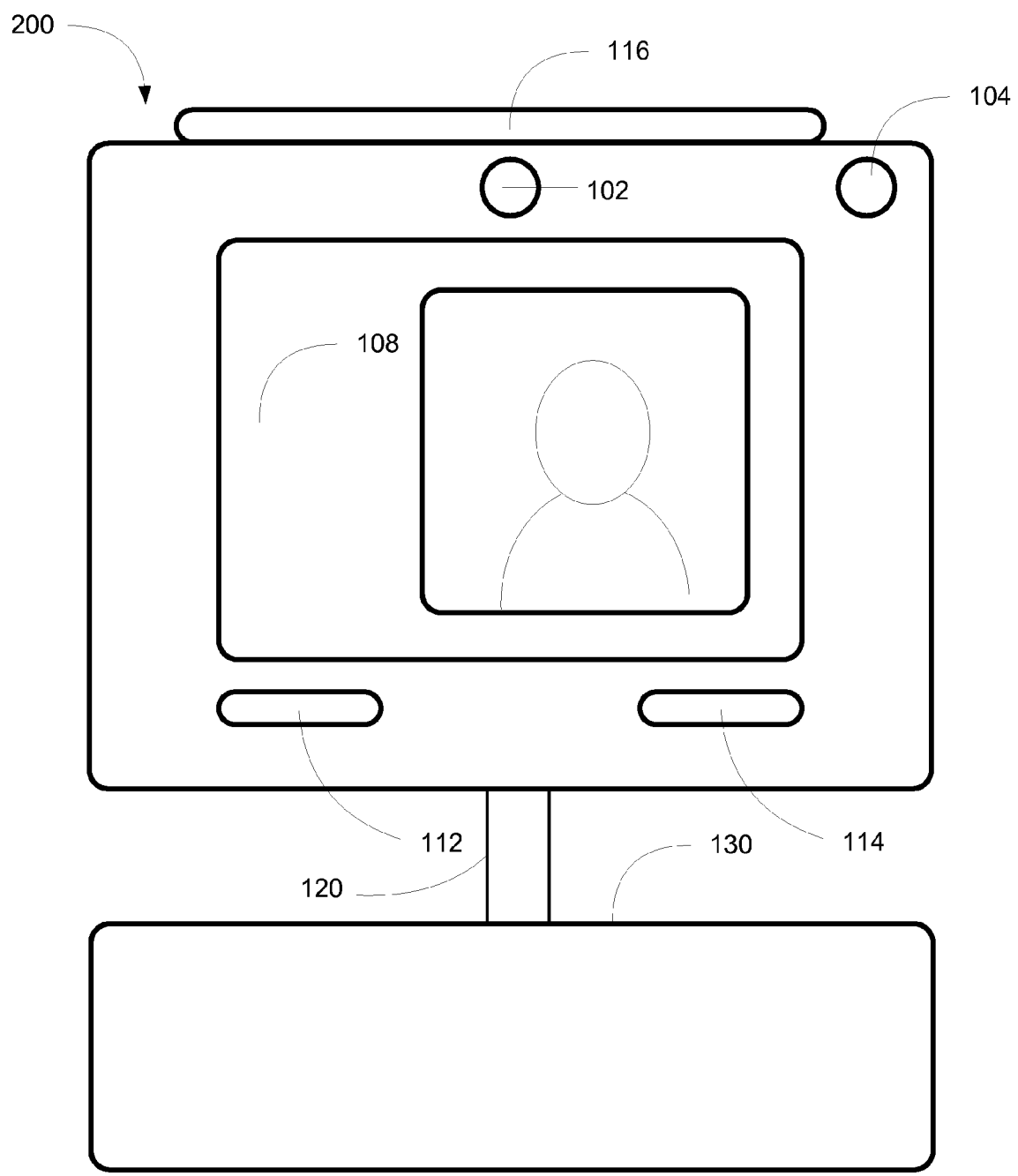
FIG. 1B is an illustration of a video communication system in an alternate implementation having an auxiliary light.

FIG. 1B is an illustration of a video communication system in an alternate implementation having an auxiliary light 116 that is coupled but is not physically integrated with display unit 200. The auxiliary light 116 may be connected to the display unit 200 or the console 130 by conventional means, including USB, FireWire, wireless (e.g., Bluetooth, 802.11, etc.), or other means. Auxiliary light 116 may be used in conjunction with the display unit 100 having integrated lights 106 and 110, and auxiliary light 116 and integrated lights 106 and 110 may be managed as a single unit, managed as individual units, or managed otherwise to achieve optimized lighting. For example, if a particular style of lighting is desired, the intensity of a first light may be increased while the color of a second light is modified and a third light is not affected.

Although the auxiliary light 116 is depicted as a slender light resting on the display unit 200, it may take any suitable shape. For example, auxiliary light 116 may be provided as a lamp on or near a desk, integrated with a stand-alone camera, provided as multiple devices (e.g., a lamp and a slender light), or in other shapes to achieve proper lighting, style, and other benefits.

Figure 2:
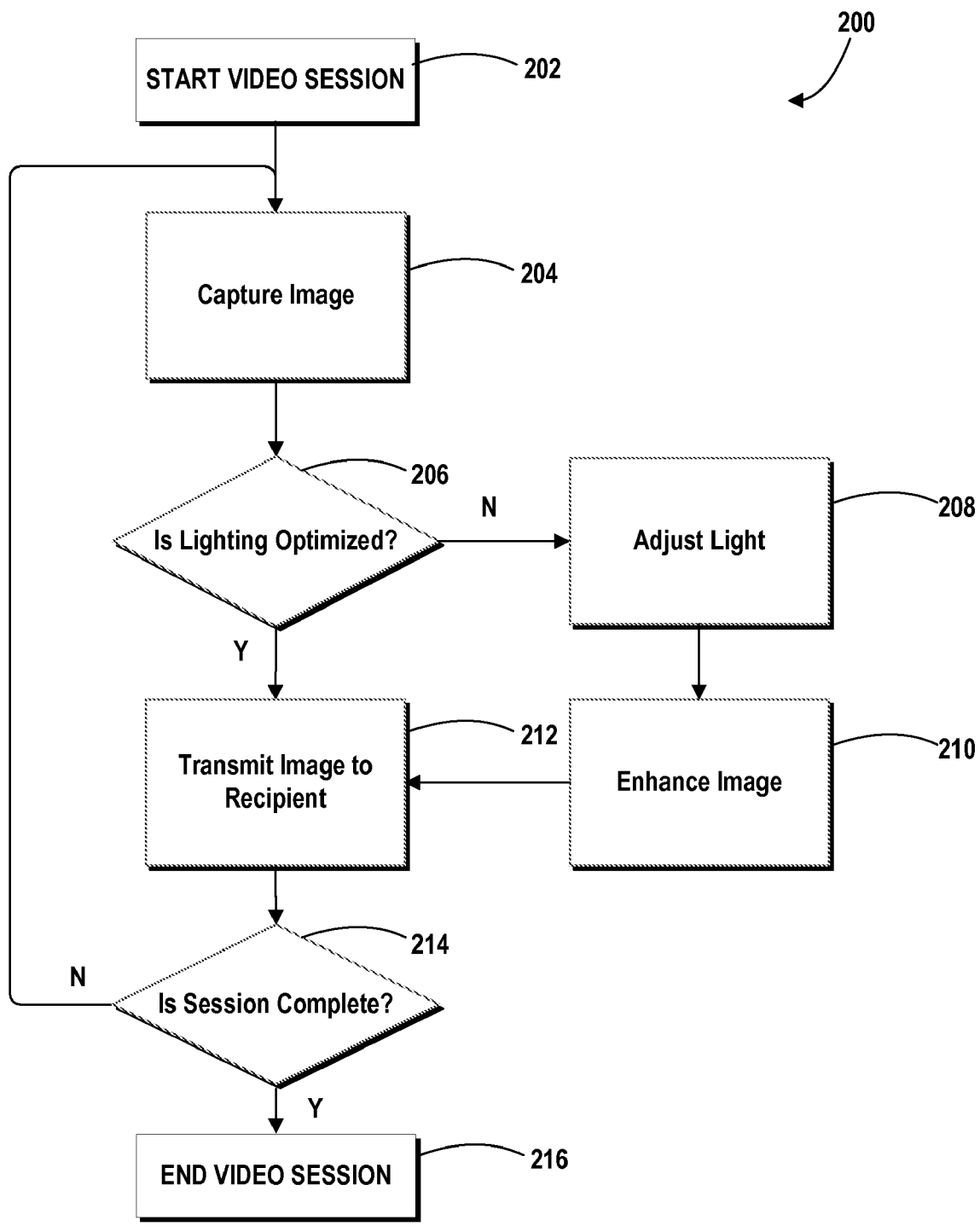
FIG. 2 shows a feedback loop process that may be performed by a computer system.

FIG. 2 shows a feedback loop process 200 that may be performed by a computer system. A user may start 202 a video session or join a video session started by another user. A camera 102, such as that shown in FIG. 1, may capture 204 an image that is part of a video stream. The CPU may determine 206 whether the lighting is optimized (based for example, on an analysis of the histogram of one or more video frames, or local areas within one or more video frames). When the lighting is not optimized, the lighting may be adjusted 208 by sending optimization instructions to a coupled light. Additionally, when the lighting is not optimized, the image may be enhanced 210 to correct for the poor lighting. The image is transmitted to the network interface where it will be transferred 212 to the intended recipient (which also occurs when the lighting is optimized at 206). If the session is not complete, the feedback control process returns to 204. Each of these elements is now described in greater detail.

A user may start 202 a video session or join a video session started by another user. Although not shown, the video communication system may include initial operations when a video session has started, such as analyzing an ambient light reading in a room, varying a light intensity/color to determine the effect on the image, requesting user input regarding the lighting and/or image quality, or perform other start-up tasks.

A camera 102 may capture 204 an image that is part of a video stream. This image may be provided from the camera to a CPU by, for example, a USB, FireWire, or other type of connection. The CPU may determine 206 whether the lighting is optimized. In one embodiment, this may be determined by analyzing the captured image to determine a difference between a set of captured image characteristics and a set of optimized image characteristics. One example of digitally modifying an image post-capture is provided by U.S. patent application Ser. No. 11/801,620, entitled LEARNING IMAGE ENHANCEMENT, filed May 10, 2007, the text and drawings of which are herein incorporated by reference. However, it is appreciated that other techniques may also be used as appropriate.

In one embodiment, the determination of whether lighting is optimized may involve a one or more stored images. These stored images, which may also be referred to as training or trained images, may be pictures selected by a user and/or by a third-party. Thus, the stored images may be of the user or one or more other people. The pictures may have a desired look representative of appropriate lighting. In one embodiment, these training images may be analyzed and/or normalized to determine a target color tone map. In another embodiment, these images may be clustered prior to generating the target color tone map. For example, clusters sharing a common characteristic, such as skin tone, race, and/or gender, may be analyzed and normalized. When an image is received, it may be analyzed with respect to the most similar cluster. If a color tone map of the captured image is outside a threshold (e.g., a standard deviation vector) for the target color tone map of the training images or the images that correspond to a particular cluster, it may be determined that the light is not optimized.

In one embodiment, feedback process 200 may involve a user input element in which a user may provide one or more training images and/or select between a number of lighting styles. Similarly, when the feedback process is unable to compensate for poor lighting, the computer system may send an instruction to a graphical user interface on the display area 108 of FIG. 1 to present information to the user. For example, a user-readable instruction may be presented that notifies the user that the background light is too bright and suggesting possible solutions (e.g., to close a blind, turn off a light, reposition a light, etc.).

Additionally or alternatively, determining 206 whether the lighting is optimized may be handled by assuming that the lighting is optimized until a change occurs. For example, the CPU may determine that ambient lighting within a room has changed (e.g., the sun is setting or a user has manually adjusted a light) by monitoring non-facial background clues (e.g., the color intensity of a wall may be measured over time). A combination of techniques for making this determination may be used as well. Conversely, this determination may be eliminated, such that for each image (or for every nth image, where n is an integer) of the video stream, the video communication system will adjust lighting 208.

When the lighting is not optimized, the lighting may be adjusted 208 by sending optimization instructions to a coupled light. Determining which optimization instructions to transmit may be implemented by analyzing the captured image from the video stream to determine a difference between a set of captured image characteristics and a set of optimized image characteristics. In one embodiment, these differences may be determined at step 206 and applied at step 208. In another embodiment, step 206 may determine only whether the difference is outside of a predetermined threshold range and a more precise determination of the difference may be made at step 208. Other techniques may also be used.

Regarding the optimized image characteristics, they may be predetermined ranges for color and intensity. Although this approach may be useful for its simplicity, it may not account for variations of style and subject matter. A preferable technique is to analyze a captured image pixel by pixel in a face region and generate a facial region color tone map. This generated facial region color tone map may be compared to a target color tone map for a set of training images. In a preferred embodiment, a target color tone map may be created for each of the clusters of training images, and the target color tone map closest to the generated facial region color tone map is used.

The comparison of color tone maps may be used to determine an optimization instruction that, when implemented by the light (e.g., light 106 and/or 110), will decrease the difference between the generated facial region color tone map and the target color tone map. For example, if the intensity of a captured image is lower than the intensity of the trained image, then extra full spectrum white lighting may be added. Furthermore, the intensity of the lighting may be tuned to move the intensity of captured image in the 3 sigma zone of the target trained images. If not only the intensity but also the light temperature in the captured image is off from the trained image, the computer system may issue instructions to adjust the Red/Blue/Green lighting to move the color temperature of the capture image into the target image zone. Generally, any characteristic of the captured image may be modified to more closely approximate a corresponding characteristic from the training images, whether this characteristic is light intensity, light temperature, or other characteristic.

The computer system may receive periodic stored image and/or algorithm updates to improve the effectiveness of the generated optimization instructions and/or to adjust to new video and/or photography styles and techniques. Furthermore, in addition to or instead of instructions, the computer system may send other types of signals or control measures to the light, including an electrical control signal, an electrical current (e.g., to control the intensity of the light), etc. In this way, lights may be built with processing capability (e.g., the ability to translate an instruction to an output) and without processing capability (e.g., relying on the computer system or other system to translate an instruction to an electrical current that manages characteristics of the light). These updates may be distributed and received using a variety of techniques, including pushing/pulling updates from a centralized server, downloading updates manually, installing via external computer readable storage media, etc.

In one embodiment, feedback process 200 may coordinate modification or optimization instructions between the camera 102 and the available lighting 106/110/116 of FIG. 1. For example, to achieve a particular affect, the CPU may send an instruction to increase intensity of a particular light (e.g., 116) and to decrease the aperture of the camera 102. The determination of which instructions to issue given a particular difference may be learned by the computer system based on historical evidence (e.g., by tracking the effect on the captured image of issued instructions over time), calculated, trained by a user, or otherwise determined.

When these optimization instructions are transmitted to and implemented by the light, the newly captured image may be closer in appearance to the training images. In a preferred embodiment, this may mean that the difference between the generated facial region color tone map and the target color tone map will be decreased. Whether the newly captured image actually is closer in appearance to the training image may depend on a variety of factors, including whether the ambient lighting outside the control of the computer system changes (e.g., a user turns on a light), whether the controlled lights have sufficient power to address a lighting situation (e.g., a user sitting far from a light source may not be notably affected by the light source), and/or whether the difference/instruction pairings are appropriate (e.g., given a determined difference, issue a corresponding optimization instruction).

When an optimization instruction does not improve the quality of subsequently captured images, the computer system may determine the cause of the failure and make an appropriate modification. For example, changes in ambient lighting may be handled in subsequent iterations of the feedback loop. Accordingly, although an initial optimization instruction may fail to correct for a change in ambient light (e.g., because the computer system did not have information about a future ambient lighting change), a subsequent optimization instruction may correct for the changed ambient light. Insufficient power to overcome a lighting situation may be addressed by notifying a user and/or providing user readable instructions for correcting the problem. Ineffective difference/instruction pairings may be identified over time, and the algorithm may be updated to provide alternate optimization instructions. Other techniques and a combination of techniques may be used.

When the lighting is not optimized, the image may be digitally enhanced 210 to correct for the poor lighting. For example, the captured image may be modified post-capture to more closely resemble one of the related clusters prior to transmitting the capture image (e.g., digitally manipulating the captured image to correct for poor lighting instead of or in addition to adjusting the actual lighting). This may be done with software and/or hardware by normalizing the generated facial region color tone map to the target color tone map for a set of training images (e.g., for the closest cluster). This element may be eliminated to save processing power or for other reasons.

The image is transmitted to the network interface where it will be transferred 212 to the intended recipient (which also occurs when the lighting is optimized at 206).

If the session is not complete, the feedback control process returns to 204. If the session is complete, the feedback process terminates at 216.

Figure 3:
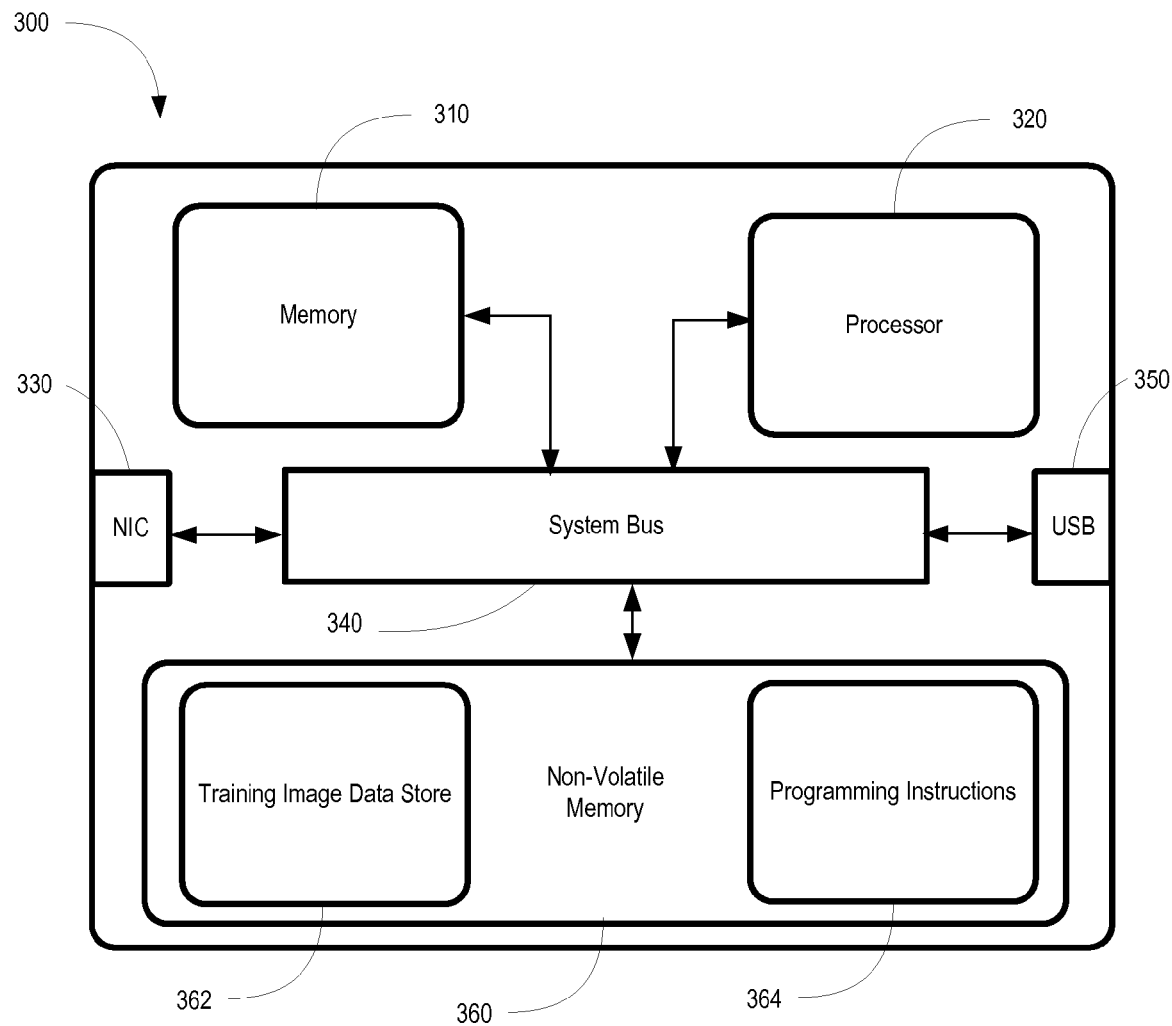
FIG. 3 shows a computer system in an exemplary implementation that is operable to automatically control a lighting unit to provide suitable lighting.

FIG. 3 shows a computer system 300 in an exemplary implementation that is operable to automatically control a lighting unit (e.g., 106, 110, and/or 116) to provide suitable lighting. The computer system may include a memory device 310, such as random access memory, a processor 320, such as a microprocessor, a network interface 330, such as a network interface card, a peripheral communication port 350, such as a USB port, and a system bus 340 that interconnects the components of the computer system 300. The network interface may enable communication with a remote computer system (not shown) during a video session. Additionally, the computer system 300 may include non-volatile memory 360 having computer readable data including a training image data store 362 and programming instructions 364, which may be stored on a file system, in a database, or otherwise. During program execution, data and instructions may be transferred from the non-volatile memory 360 to memory 310.

Non-volatile memory 360 and memory 310 are both examples of computer readable storage media. By way of example, and not limitation, computer readable storage media may include volatile and non-volatile, removable and non-removable media implemented in any method or technology for storage of information such as computer readable instructions, data structures, program modules, or other data. Computer readable storage media includes, but is not limited to, RAM, ROM, EEPROM, flash memory, or other memory technology, CD-ROM, digital versatile disks (DVD) or other optical storage devices, or any other medium which can be used to store the desired information and which can be accessed by computer system 300.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like. Furthermore, although the context for the disclosed system and method are for video communication, the system and method may operate outside the video communication context, such as a video weblog, a commercial recording, or other non-conference video recording.

The invention claimed is:

1. A video communication system comprising:
   a video camera coupled with a console;
   at least one light coupled with the console; and
   the console including a computer readable storage medium having computer-readable instructions for performing a feedback control process, the feedback control process comprising:
   receiving a first image from the video camera;
   determining an initial difference between the first image and a plurality of stored images, wherein the plurality of stored images are grouped into clusters based on one or more visual similarities between individual images of the plurality of stored images, and wherein the first image is compared to one of the clusters; and
   transmitting an optimization instruction to the at least one light, wherein implementation of the optimization instruction decreases a subsequent difference between a second image received from the video camera and the plurality of stored images.

2. The video communication system of claim 1, wherein the at least one light is removably coupled to the console.

3. The video communication system of claim 1, wherein the at least one light is integrated with a display unit.

4. The video communication system of claim 1, wherein the feedback control process further comprises:
   digitally enhancing the first image to produce an enhanced first image prior to transmitting the enhanced first image to a remote computer.

5. A computer system comprising:
   a memory device;
   a processor; and
   a computer readable storage medium encoding a computer program for executing a computer process to improve image quality, the computer process comprising:
   comparing a captured image to a collection of stored images;
   determining a related cluster of stored images within the collection of stored images that is most closely related to the captured image;
   determining a lighting modification instruction that would decrease a difference between the related cluster of stored images and a subsequent captured image; and
   transmitting the lighting modification instruction to at least one lighting device.

6. The computer system of claim 5, wherein the collection of stored images comprises pictures of faces, and wherein the stored images of the collection of stored images are clustered based on a similarity between facial regions of the stored images.

7. The computer system of claim 5, wherein individual stored images of the collection of stored images comprise a picture of a face having a skin tone and, and wherein the stored images of the collection of stored images are clustered based on a similarity between the skin tone of individual stored images.

8. The computer system of claim 5, wherein the computer process additionally comprises modifying a characteristic of the captured image to more closely resemble a characteristic of one of the related clusters prior to transmitting the captured image.

9. The computer system of claim 5, wherein the lighting modification instruction comprises at least one member of a group comprising an instruction to adjust lighting intensity and an instruction to adjust lighting color.

10. The computer system of claim 5, wherein the computer process additionally comprises determining and transmitting a camera setting modification configured to decrease a difference in conjunction with the lighting modification.

11. The computer system of claim 5, wherein the at least one lighting device comprises a first lighting device and a second lighting device, and wherein the lighting modification instruction comprises a first instruction to the first lighting device and a second instruction to the second lighting device, the first instruction being different from the second instruction.

12. A computer readable storage medium having computer-readable instructions for performing a process, the process comprising:
   receiving a first image from a video camera;
   selecting, from a plurality of stored images, an individual stored image having a minimal difference from the first image; and
   transmitting an optimization instruction to control a light associated with the video camera, wherein implementation of the optimization instruction allows a subsequent difference between a second image received from the video camera and the individual stored image to be smaller than the minimal difference.

13. The computer readable storage medium of claim 12, wherein the process further comprises transmitting the first image to a recipient as part of a video stream.

14. The computer readable storage medium of claim 13, wherein the process further comprises digitally enhancing the first image prior to transmitting the first image to the recipient.

15. The computer readable storage medium of claim 12, wherein the optimization instruction comprises an instruction to adjust an intensity of the light.

16. The computer readable storage medium of claim 12, wherein the optimization instruction comprises an instruction to adjust a color.

17. The computer readable storage medium of claim 12, wherein the process further comprises sending an instruction to a display to generate a user-readable instruction.

* * * * *